(12) United States Patent
Iwasaki (10) Patent No.: US 7,804,829 B2
(45) Date of Patent: Sep. 28, 2010

(54) WIRELESS COMMUNICATION SYSTEM, DATA TRANSMITTER AND WIRELESS COMMUNICATION METHOD

(75) Inventor: Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 11/328,170

(22) Filed: Jan. 10, 2006

(65) Prior Publication Data

US 2006/0187921 A1 Aug. 24, 2006

(30) Foreign Application Priority Data

Jan. 13, 2005 (JP) ............................ P2005-006783

(51) Int. Cl.
*H04L 12/28* (2006.01)
(52) U.S. Cl. ........................ 370/389; 370/310; 370/465; 455/25; 455/63.4; 455/158.4; 455/158.5; 455/566; 455/575.7
(58) Field of Classification Search .................. 370/389, 370/310, 465; 455/25, 63.4, 158.4, 158.5, 455/566, 575.7
See application file for complete search history.

(56) References Cited

U.S. PATENT DOCUMENTS

| 6,430,405 B1 * | 8/2002 | Jambhekar et al. ........... 455/403 |
| 7,121,467 B2 * | 10/2006 | Winter et al. ............. 235/462.2 |
| 7,317,475 B2 * | 1/2008 | Arai et al. ............... 348/207.99 |
| 2002/0119808 A1 * | 8/2002 | Seiki ........................... 455/575 |
| 2003/0037033 A1 * | 2/2003 | Nyman et al. ................... 707/1 |
| 2005/0165923 A1 * | 7/2005 | Miyake et al. .............. 709/223 |
| 2006/0135142 A1 * | 6/2006 | Repka ......................... 455/418 |
| 2007/0147681 A1 * | 6/2007 | Van De Sluis .............. 382/190 |

FOREIGN PATENT DOCUMENTS

JP          11-150671          6/1999

* cited by examiner

*Primary Examiner*—Patrick N Edouard
*Assistant Examiner*—Shantell Heiber
(74) *Attorney, Agent, or Firm*—Finnegan, Henderson, Farabow, Garrett & Dunner, L.L.P.

(57) ABSTRACT

A wireless communication system includes a data transmitter, having an image pickup device, and a plurality of data receivers, for performing interactive wireless data communications between the data transmitter and each of the data receivers. The data transmitter includes a display for displaying an image of a data receiver photographed by the image pickup device, from among the plurality of data receivers, a data transmission destination recognizer, a directional antenna controller for directing a directional antenna to the data receiver recognized as a transmission destination of transmission data by the data transmission destination recognizer, a command transmitter for transmitting a communication designation command to the data receiver, and a device address storage for storing a device address of the data receiver. The data receiver includes a command receiver, and an ACK transmitter.

9 Claims, 8 Drawing Sheets

| DISTANCE | TRANSMISSION OUTPUT |
|---|---|
| 0-3 m | -25 dBm |
| 3-8 m | -15 dBm |
| 8-10 m | -0 dBm |

FIG. 10

| DISTANCE | SPREADING RATE | TRANSMISSION RATE |
|---|---|---|
| 0-3 m | 1 | 1 Gbps |
| 3-8 m | 4 | 250 Mbps |
| 8-10 m | 16 | 62.5 Mbps |

FIG. 11

| WIRELESS COMMUNICATION MODE | COMMUNICATION COVERAGE | MAXIMUM TRANSMISSION RATE |
|---|---|---|
| A (SUCH AS BLUETOOTH) | 10 m | 20 Mbps |
| B (SUCH AS UWB) | 10 m | 1 Gbps |
| C (SUCH AS 802.11) | 100 m | 100 Mbps |

WIRELESS COMMUNICATION SYSTEM, DATA TRANSMITTER AND WIRELESS COMMUNICATION METHOD

CROSS REFERENCES TO RELATED APPLICATIONS

The present invention contains subject matter related to Japanese Patent Application JP 2005-006783 filed in the Japanese Patent Office on Jan. 13, 2005, the entire contents of which are incorporated herein by reference.

BACKGROUND OF THE INVENTION

1. Field of the Invention

The present invention relates to a wireless communication system, a data transmitter, and a wireless communication method.

2. Description of the Related Art

AS information technology advances, local area network (LAN) is widely used. In LANs, information, such as files and data, is transmitted to, received from, and shared among a plurality of computers connected to each other by information communication means.

As information processing apparatuses, such as personal computers, are widely used, home electronics are computerized. With this background, wireless-personal area network (W-PAN) draws attention (as disclosed in Japanese Unexamined Patent Application Publication No. 11-150671). In the W-PAN, home electronics are wirelessly connected and used by individuals at home. The W-PAN is a high-speed wireless system that works in a small area within a radius of 10 m or so.

When information, such as a file or data, is exchanged between a digital camera and a printer, these apparatuses need to be connected to each other via cable. The W-PAN can be substituted for the cable. Apparatuses communicable with each other within the W-PAN acquire information of nearby wireless terminals, and wireless terminals remain connectable with each other.

SUMMARY OF THE INVENTION

To transmit data from a wireless terminal of a user to the other wireless terminal, the other wireless terminal needs to be identified as a data transmission destination. As described above, all wireless terminals, if powered on, remain connectable to each other. The user thus needs to enter settings to designate one wireless terminal as the data transmission destination from among the wireless terminals that remain connectable. This inconveniences the user.

It is desirable to provide a wireless communication system, a data transmitter, and a data transmission method for permitting a user to easily designate a wireless terminal from among a plurality of wireless terminals without any complex setting, and to reduce workload imposed on the user in operation.

In accordance with one embodiment of the present invention, a wireless communication system includes a data transmitter, having an image pickup device, and a plurality of data receivers and performs interactive wireless data communications between the data transmitter and each of the data receivers. The data transmitter includes a display for displaying an image of a data receiver photographed by the image pickup device, from among the plurality of data receivers, a data transmission destination recognizer for recognizing, as a transmission destination of transmission data, the data receiver with the image thereof displayed on the display, a directional antenna controller for directing a directional antenna to the data receiver recognized as the transmission destination of the transmission data by the data transmission destination recognizer, a command transmitter for transmitting a communication designation command to the data receiver to which the directional antenna is directed by the directional antenna controller, and a device address storage for storing a device address of the data receiver. The data receiver includes a command receiver for receiving the communication designation command transmitted by the data transmitter, and an ACK transmitter for transmitting, to the data transmitter, an ACK packet containing the device address of the data receiver, subsequent to a reception of the communication designation command by the communication designation command receiver.

The image pickup device included in the data transmitter photographs the data receiver as the data transmission destination, and the communication designation command is transmitted to the photographed data receiver. The data receiver having received the communication designation command transmits, to the data transmitter, the ACK (acknowledge) packet containing the device address of the data receiver. The data transmitter can thus transmit the transmission data in accordance with the device address contained in the ACK packet. With this arrangement, the user can thus easily and intuitively designate the data receiver as the data transmission destination by simply photographing the data receiver.

In accordance with another embodiment of the present invention, a data transmitter, having an image pickup device, for performing interactive wireless data communications with each of a plurality of data receivers, includes a display for displaying an image of a data receiver photographed by the image pickup device, from among the plurality of data receivers, a data transmission destination recognizer for recognizing, as a transmission destination of transmission data, the data receiver with the image thereof displayed on the display, a directional antenna controller for directing a directional antenna to the data receiver recognized as the transmission destination of the transmission data by the data transmission destination recognizer, a command transmitter for transmitting a communication designation command to the data receiver to which the directional antenna is directed by the directional antenna controller, an ACK receiver receiving an ACK packet, containing the device address of the data receiver, from the data receiver to which the communication designation command has been transmitted by the command transmitter, and a device address storage for storing the device address of the data receiver received by the ACK receiver.

With the above-described arrangement, the user can easily and intuitively designate the data receiver as the data transmission destination by simply photographing the data receiver.

The data transmitter may further include a non-directional antenna and the directional antenna, a transmission destination designation mode setter for setting a transmission destination designation mode in response to an input by a user, and an antenna switch for switching from the non-directional antenna to the directional antenna if the transmission destination designation mode is set by the transmission destination designation mode setter. The antenna switch switches from the directional antenna to the non-directional antenna after the device address storage stores the device address of the data receiver.

The data transmitter, including the directional antenna and the non-directional antenna, switches between the directional antenna and the non-directional antenna in response to an input by the user. The data transmitter normally functions as a typical mobile terminal with the non-directional antenna. The data transmitter uses the directional antenna only when the data transmission destination is designated.

The communication designation command transmitted to the data receiver by the command transmitter may include information identifying the data transmitter, a length of transmission data, and a type of the transmission data. With this arrangement, the data receiver having received the communication designation command determines whether the data receiver can receive the data transmitted from the data transmitter.

The device address of the data receiver stored in the device address storage may be transmitted together with the data to be transmitted to the data receiver. With this arrangement, the data transmitter can transmit the data to the data receiver designated by the device address.

The command transmitter may transmit the communication designation-command using infrared light to the data receiver with the image thereof displayed on the display. With this arrangement, the communication designation command can be transmitted using infrared light without the need for switching from the non-directional antenna to the directional antenna, and one data receiver can be designated from among the plurality of data receivers.

The image pickup device in the data transmitter may measure a distance to the data receiver using an infrared autofocus mechanism, and determine transmission power of the transmission data in response to the measured distance.

The image pickup device in the data transmitter may measure a distance to the data receiver using an infrared autofocus mechanism, and determine a transmission rate of the transmission data in response to the measured distance.

The image pickup device in the data transmitter may measure a distance to the data receiver using an infrared autofocus mechanism, and determine a wireless communication mode of the transmission data in response to the measured distance.

In accordance with embodiments of the present invention, a distance between apparatuses is measured, and the wireless transmission output power, the data transmission rate, and the communication mode can be determined based on the measured distance. Effective communications are thus performed.

In accordance with another embodiment of the present invention, a method of performing interactive wireless data communications between a data transmitter, having an image pickup device, and a plurality of data receivers, includes steps of displaying an image of a data receiver photographed by the image pickup device, from among the plurality of data receivers, recognizing, as a transmission destination of transmission data, the data receiver with the image thereof displayed in the displaying step, directing a directional antenna to the data receiver recognized as the transmission destination of the transmission data in the data transmission destination recognizing step, transmitting a communication designation command to the data receiver to which the directional antenna is directed in the directional antenna directing step, receiving an ACK packet, containing the device address of the data receiver, from the data receiver to which the communication designation command has been transmitted in the command transmitting step, and storing the device address of the data receiver received in the ACK receiving step.

In accordance with embodiments of the present invention, the wireless communication system, the data transmitter, and the data transmission method allow the user to easily designate a wireless terminal from a plurality of wireless linked terminals without the need for complex setting, and reduces workload imposed on the user.

DESCRIPTION OF THE PREFERRED EMBODIMENTS

The embodiments of the present invention are described below in detail with reference to the drawings. In this specification and the drawings, elements having substantially identical functions are designated with the same reference numeral and the discussion thereof is not repeated.

Figure 1:
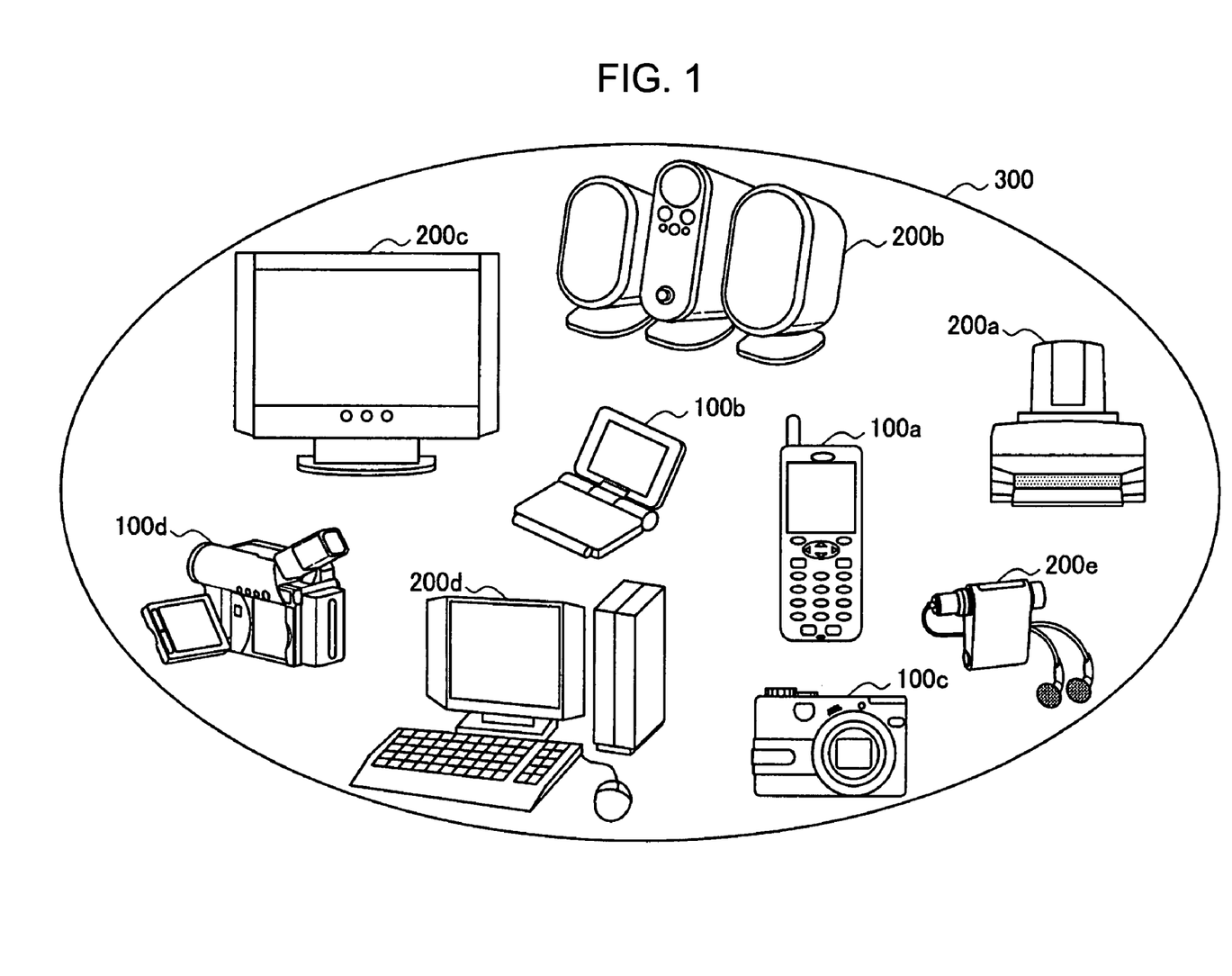
FIG. 1 illustrates a wireless communication system in accordance with one embodiment of the present invention.

A wireless communication system of one embodiment of the present invention is described below with reference to FIG. 1. FIG. 1 illustrates the wireless communication system of this embodiment of the present invention.

A wireless communication network composed of a communication device connected to a network, such as the Internet, and a communication device, such as a mobile personal computer, with one device wirelessly linked to the other device, becomes widely used. IEEE (the Institute of Electrical and Electronics Engineers) 802.11, HiperLAN/2, IEEE 802.15.3, and Bluetooth are available as standards for wireless networks. The IEEE802.11 Standard includes various wireless communication protocols IEEE802.11a, IEEE802.11b, etc. different in wireless communication mode and frequency bands.

In one of the wireless communication networks, ad-hoc communications are performed between communication terminals not via an access point. In such an ad-hoc communication, the communication terminals directly communicate with each other in asynchronous manner under the control of CSMA protocols. In ultra wide band (UWB) communications standardized in IEEE802.15.3, networks are managed via an access point, and an ad-hoc communication (or mesh communication) is performed as a data communication using a packet structure having a preamble.

Wireless-personal area network (W-PAN) is known as a network available to individuals at home. The W-PAN is a high-speed wireless communication usable within a small service area of a radius of about 10 m. Terminals communicable within the service area of W-PAN acquires information from nearby terminals so that the wireless terminals are connected to each other.

As shown in FIG. 1, a data receiver 200 and a data transmitter 100, present in W-PAN 300, can transmit data to and receive data from each other in wireless communication. For example, the W-PAN 300 includes a mobile telephone 100a including the data transmitter 100, a personal digital assistant (PDA) 100b including the data transmitter 100, a digital camera 100c including the data transmitter 100, a digital video camera 100d including the data transmitter 100, a printer 200a including the data receiver 200, a audio system 200b including the data receiver 200, a television 200c including the data receiver 200, a personal computer (PC) 200d including the data receiver 200, and a mobile CD drive 200e including the data receiver 200.

Since each of the mobile terminals is provided with non-directional antenna, radiowaves are transmitted to all nearby mobile terminals. If all terminals included in the W-PAN 300 are powered on, one terminal can acquire information from the nearby terminals to be ready for communication. For example, the mobile telephone 100a is prepared to communicate with the terminals other the mobile telephone 100a. To transmit data to the printer 200a, a user needs to set the printer 200a as a data transmission destination.

To set the printer 200a as a data transmission destination, the user needs to perform complex setting, such as examining a device address of the printer 200a and entering the found device address. A list of device addresses that remain connectable can be displayed on a display of the mobile telephone 100a. Even if the list of device addresses are displayed, the address of the data transmission destination must be checked and selected.

The data transmitter 100 includes an image pickup device such as a charge-coupled device (CCD) for picking up an image. The user photographs the data receiver 200 as a data transmission destination, and identifies the data transmission destination by transmitting a communication designation command to the photographed data receiver 200. Unlike the non-directional antenna, a directional antenna transmits radiowaves to a predetermined direction only. In accordance with the present embodiment, the data transmitter 100 includes the non-directional antenna and the directional antenna, and switches between the non-directional antenna and the non-directional antenna as necessary. The data transmitter 100 thus easily designates the data receiver 200 as a data transmission destination. The function and structure of the data receiver 200 of the present embodiment of the present invention are described below with reference to FIG. 2.

Figure 2:
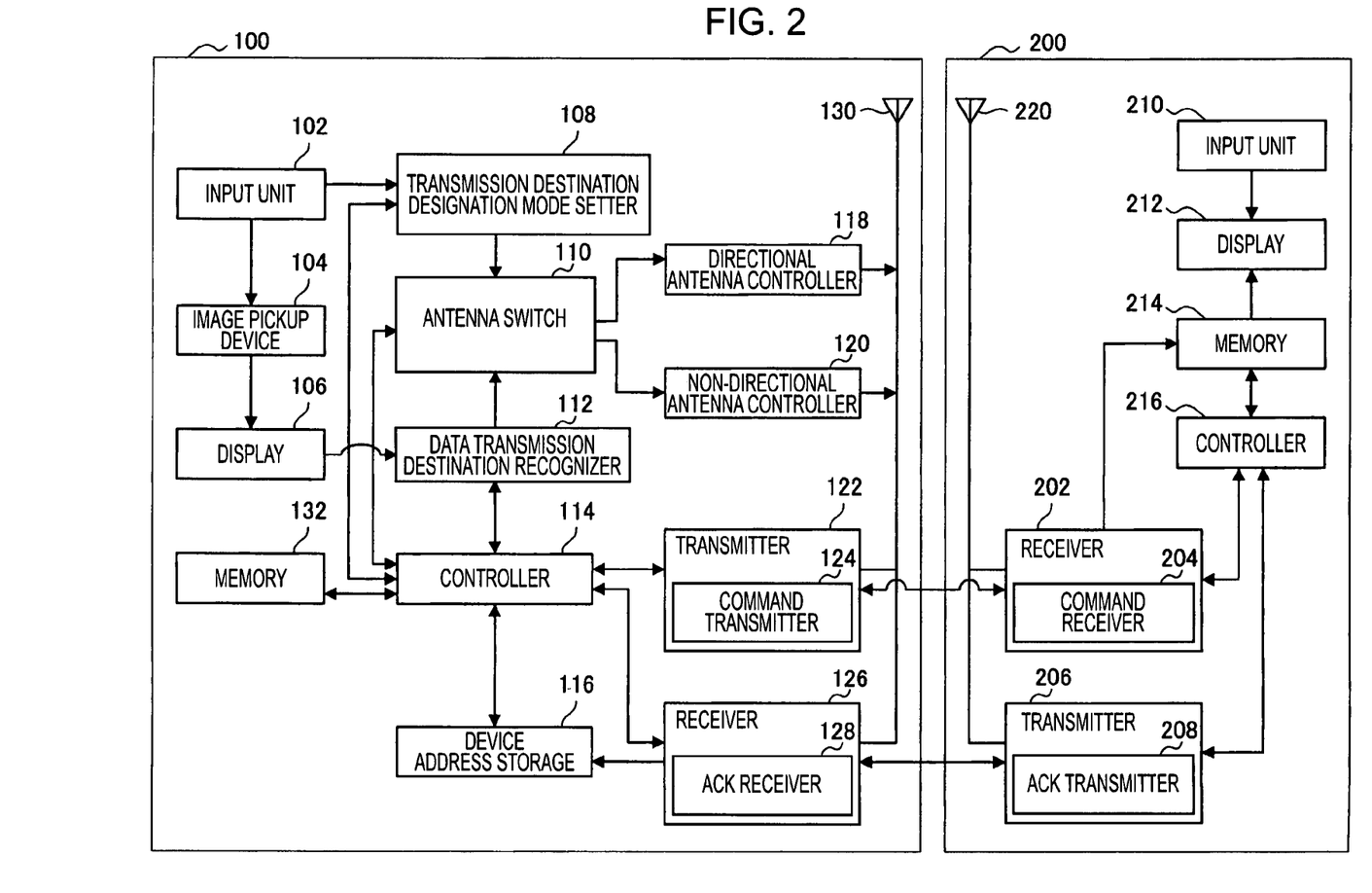
FIG. 2 is a functional block diagram of a data transmitter and a data receiver in accordance with the embodiment of the present invention.

FIG. 2 is a functional block diagram of the data transmitter 100 of the present embodiment. As shown in FIG. 2, the data receiver 200 includes an input unit 102, an image pickup device 104, a display 106, a transmission destination designation mode setter 108, an antenna switch 110, a data transmission destination recognizer 112, a controller 114, a device address storage 116, a directional antenna controller 118, a non-directional antenna controller 120, a transmitter 122, a receiver 126, an antenna 130, and a memory 132.

The input unit 102, serving as an interface for receiving inputs from the user, includes operational elements, such as a keyboard, a touchpanel, a button, a switch, a lever, etc., and an input control circuit for generating and outputting an input signal. Upon receiving an input from the user, the input unit 102 generates an input signal responsive to the input, and supplies the input signal to the transmission destination designation mode setter 108 and the image pickup device 104.

The image pickup device 104, such the CCD, picks up an image, and the image captured by the image pickup device 104 is supplied to the display 106. The display 106 includes a display such as a cathode-ray tube (CRT), a liquid-crystal display (LCD), or a lamp, and an audio output device such as a loudspeaker. The display 106 displays the image captured by the image pickup device 104.

The data transmission destination recognizer 112 recognizes, as a data transmission destination, the data receiver 200 with the image thereof displayed on the display 106. The user may selects a button to enter user input to recognize the data receiver 200 displayed on the display 106 as the data transmission destination. When the data receiver 200 is displayed on the display 106 followed by the user selection of the button, the data receiver 200 may be recognized as the data transmission destination. The data transmission destination recognizer 112 supplies recognition information of the data receiver 200 to each of the antenna switch 110 and the directional antenna controller 118.

In response to the user input, the transmission destination designation mode setter 108 sets a transmission destination designation mode. In the transmission destination designation mode, the data receiver 200 can be designated as the data transmission destination. If the transmission destination designation mode is set, the antenna 130 in the data transmitter 100 is switched from the non-directional antenna to the directional antenna. If the transmission destination designation mode is set by the transmission destination designation mode setter 108, the setting information is supplied to the antenna switch 110.

If the transmission destination designation mode setter 108 sets the transmission destination designation mode or if the data transmission destination recognizer 112 supplies the recognition information of the data receiver 200, the antenna switch 110 switches the antenna 130 to the directional antenna and instructs the directional antenna controller 118 to direct the directional antenna to the data receiver 200 as the data transmission destination.

In response to the command from the antenna switch 110, the directional antenna controller 118 switches the antenna 130 to the directional antenna and directs the directional antenna to the data-receiver 200 as the data transmission destination.

The non-directional antenna controller 120 switches the antenna 130 to the non-directional antenna if the transmission destination designation mode is canceled, or if any particular data receiver 200 is not designated.

The transmitter 122 is a communication interface composed of a communication line, a communication circuit, a communication device, etc., and includes at least a command transmitter 124. The command transmitter 124 transmits the communication designation command to the command receiver 204 in the data receiver 200 recognized as the data transmission destination by the data transmission destination recognizer 112. The communication designation command transmitted from the command transmitter 124 in the data transmitter 100 to the command receiver 204 in the data receiver 200 will be described later.

The controller 114 controls all elements in the data transmitter 100. Depending on setting status of the transmission destination designation mode set by the transmission destination designation mode setter 108 and recognition status of the data transmission destination recognized by the data transmission destination recognizer 112, the controller 114 switches the antenna 130 via the antenna switch 110 and transmits the communication designation command to the data receiver 200 via the transmitter 122.

The receiver 126 is a communication interface composed of a communication line, a communication circuit, a communication device, etc., and includes at least the ACK (acknowledgement) receiver 128. The ACK receiver 128 receives an ACK packet of the data receiver 200 from the ACK transmitter 208 in the transmitter 206 in the data receiver 200. The ACK packet contains a device address of the data receiver 200. The ACK receiver 128 supplies the device address of the data receiver 200 to the device address storage 116.

The device address storage 116 stores the device address of the data receiver 200 supplied by the ACK receiver 128. Furthermore, the device address storage 116 notifies the controller 114 that the device address storage 116 has stored the device address of the data receiver 200. Upon being notified of the storage of the device address, the controller 114 cancels the transmission destination designation mode, and switches the antenna 130 from the directional antenna to the non-directional antenna.

The memory 132, storing a variety of data, includes a hard disk drive, a flash memory, or the like.

Once the data transmitter 100 designates the data receiver 200 as the data transmission destination, transmission data is transmitted to the data receiver 200 as performed in an ordinary wireless communication system. The structure of a standard wireless communication packet will be described later.

The function and structure of the data transmitter 100 have been discussed. The function and structure of the data receiver 200 are described below.

The data receiver 200 includes a receiver 202, a transmitter 206, an input unit 210, a display 212, a memory 214, a controller 216, and an antenna 220.

The receiver 202 is a communication interface composed of a communication line, a communication circuit, a communication device, etc., and at least includes a command receiver 204. The command receiver 204 receives the communication designation command transmitted by the command transmitter 124 in the data transmitter 100.

A transmitter 206 is a communication interface composed of a communication line, a communication circuit, a communication device, etc., and at least includes an ACK transmitter 208. After the command receiver 204 receives the communication designation command, the ACK transmitter 208 transmits the ACK packet to the ACK receiver 128 in the data transmitter 100 to notify the data transmitter 100 that the communication designation command has been received.

The input unit 210 is an interface for receiving inputs from the user, and includes operational elements, such as a keyboard, a touchpanel, a button, a switch, a lever, etc., and an input control circuit for generating and outputting an input signal.

The display 212 includes a display such as a cathode-ray tube (CRT), a liquid-crystal display (LCD), or a lamp, and an audio output device such as a loudspeaker. The display 106 displays the image captured by the image pickup device 104. The memory 214, storing a variety of data, includes a hard disk drive, a flash memory, or the like. The memory 214 stores data transmitted from the data transmitter 100.

The controller 216 controls all elements in the data receiver 200. After the command receiver 204 receives the communication designation command, the controller 216 controls the ACK transmitter 208 to transmit the ACK packet.

Figure 3:
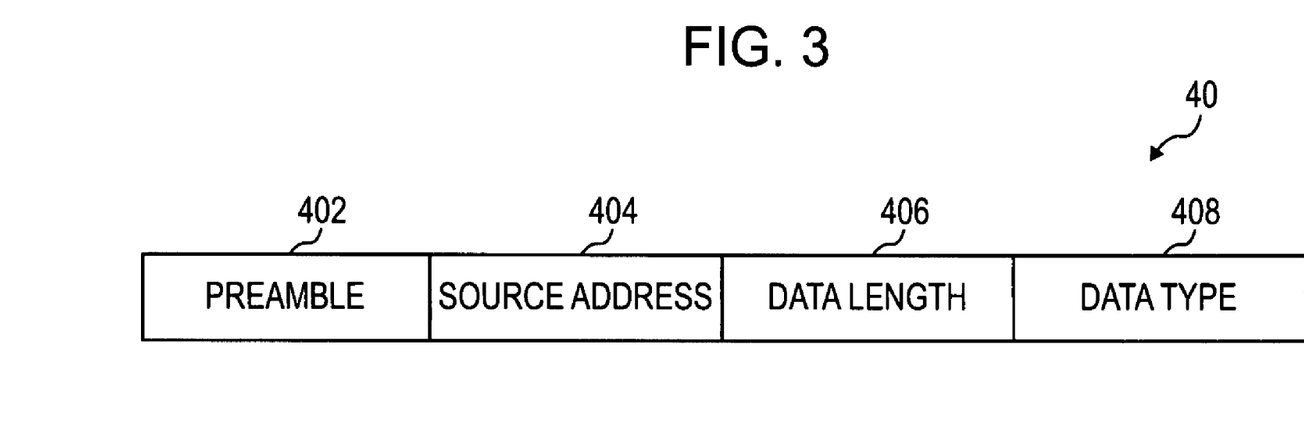
FIG. 3 illustrates a communication designation command to be transmitted by the data transmitter in accordance with the embodiment of the present invention.
Figure 4:
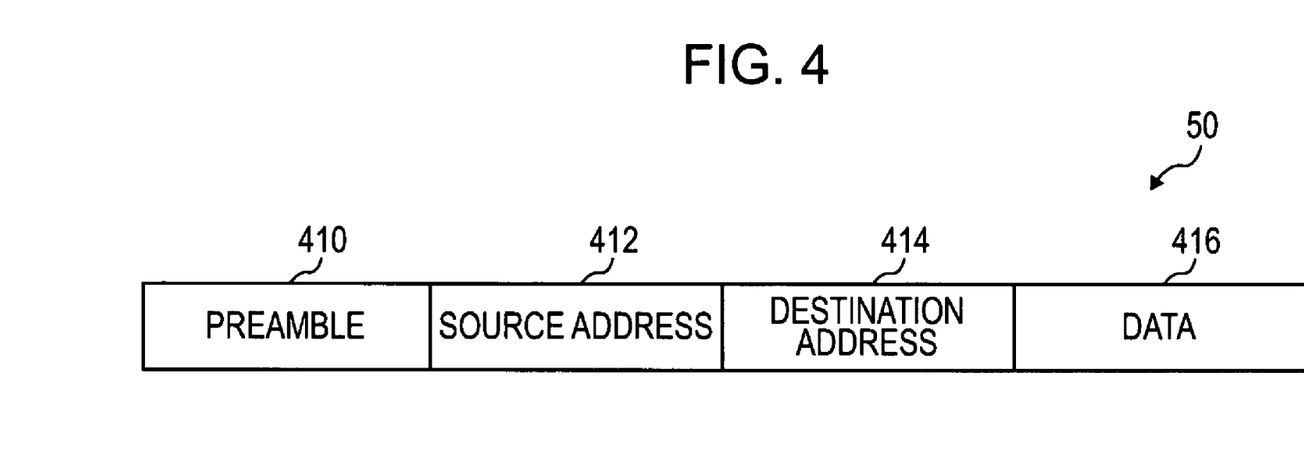
FIG. 4 illustrates a communication packet widely used wireless communications.

The function and structure of the data transmitter 100 and the data receiver 200 have been discussed. It is sufficient if the data receiver 200 includes the transmitter 206, the receiver 202, and the controller 216. For example, the data transmitter 100 of FIG. 2 may be used as the data receiver 200. Referring to FIGS. 3 and 4, the communication designation command and the communication packet are described below.

FIG. 3 illustrates the structure of the communication designation command transmitted from the command transmitter 124 of the data transmitter 100. A communication designation command 40 includes a preamble 402, a source address 404, data length 406, and data type 408.

The preamble 402 is used to notify another terminal of the transmission of a frame in data communication. The data receiver 200 can recognize the start of the frame by receiving the frame containing the preamble 402.

The source address 404 is information of the data transmitter 100 as the source of transmission data, and is a device address of the data transmitter 100, for example. The data length 406 and the data type 408 respectively represent the length and the type of the data transmitted from the data transmitter 100 to the data receiver 200 subsequent to the establishment of connection therebetween.

Upon receiving the communication designation command 40, the data receiver 200 can learn the source address, the data length, and the data type of the data. The communication designation command 40 has been discussed. The structure of the typical wireless communication packet is described below.

FIG. 4 illustrates the structure of a typical wireless communication packet. Before transmitting the transmission data, the data transmitter 100 transmits the communication designation command 40 to the data receiver 200. Upon receiving the communication designation command 40, the data receiver 200 verifies that there is no problems with the length and type of the data to be transmitted, and then transmits the ACK packet to the data transmitter 100. The ACK packet transmitted from the data receiver 200 to the data transmitter 100 contains the device address of the data receiver 200. The data transmitter 100 having received the ACK packet from the data receiver 200 transmits the communication packet containing the transmission data to the data receiver 200.

As shown in FIG. 4, a communication packet 50 includes a preamble 410 for establishing front end synchronization, a source address 412, a destination address 414, data 416, etc.

Like the preamble 402 of the communication designation command 40, the preamble 410 is used to notify another terminal of the transmission of a frame in data communication. The source address 412 is a device address of the data transmitter 100. The destination address 414 is a device address of the data receiver 200 as the transmission destination contained the above-described ACK packet. The data 416 is data having the data length 406 and the data type 408 of the communication designation command 40.

The data transmitter 100 of the present embodiment transmits the communication designation command 40 to the data receiver 200 located in the direction the directional antenna looks toward. Upon receiving the communication designation command 40, the data receiver 200 transmits the ACK packet to the data transmitter 100. Upon receiving the device address information of the data receiver 200, the data transmitter 100 can transmit data to the data receiver 200.

The user having the data transmitter 100 is freed from inputting the device address of the data receiver 200 and selecting one data receiver from a plurality of data receivers.

The user simply photographs the data receiver 200 as the data transmission destination, and selects a button to designate the data transmission destination.

The structure of the communication packet has been discussed. A typical wireless connection protocol is described with reference to FIG. 5.

Figure 5:
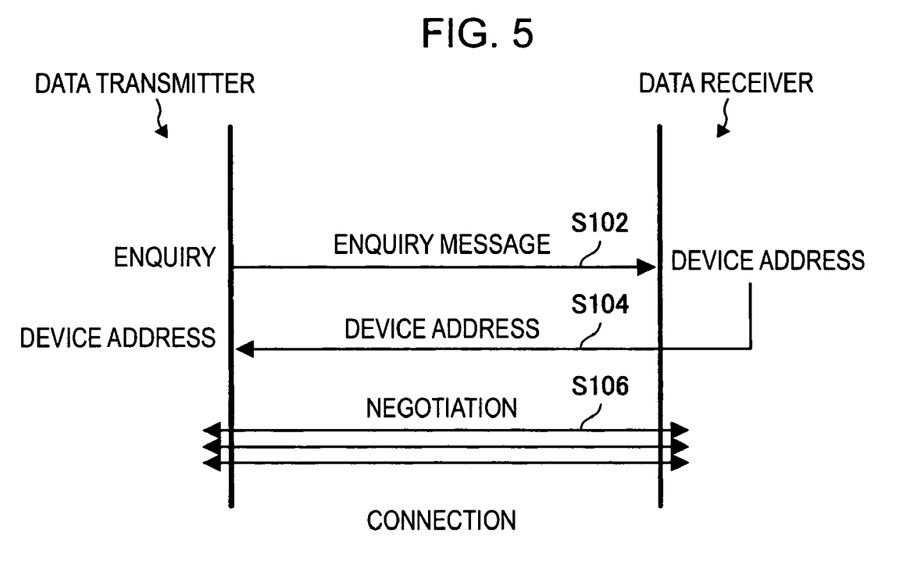
FIG. 5 illustrates a typical wireless communication protocol.

FIG. 5 illustrates a typical wireless connection protocol. The data transmitter 100 first determines whether any wireless communication apparatus ready to communicate is available around the data transmitter 100. The data transmitter 100 can learn, in advance, the wireless communication apparatuses around own apparatus, and which apparatus the data transmitter 100 can communicate with. This step is referred to as an "enquiry" step. In the enquiry step, the data transmitter 100 distributes an enquiry message to the nearby apparatuses (step S102).

Upon receiving the enquiry message in step S102, the data receiver 200 returns, to the data transmitter 100, information relating to the device address of the data receiver 200 (step S104). Upon receiving the device address of the data receiver 200 in step S104, the data transmitter 100 learns based on the address information what apparatus is present around own apparatus (in negotiation)(step S106). The data transmitter 100 connects to the data receiver 200 that has returned the address information.

The data transmitter 100 and the data receiver 200, connected to each other using the wireless connection protocol, can exchange data. With a plurality of wireless apparatuses enabled to transmit and receive data, the data transmitter 100 designates the data receiver 200 to which the data is to be forwarded. In accordance with the present embodiment, the data transmitter 100 can designate the data receiver 200 as the data transmission destination in an intuitively recognizable manner without the need for complex setting. Data exchange between the wireless apparatuses is easily performed.

Figure 6:
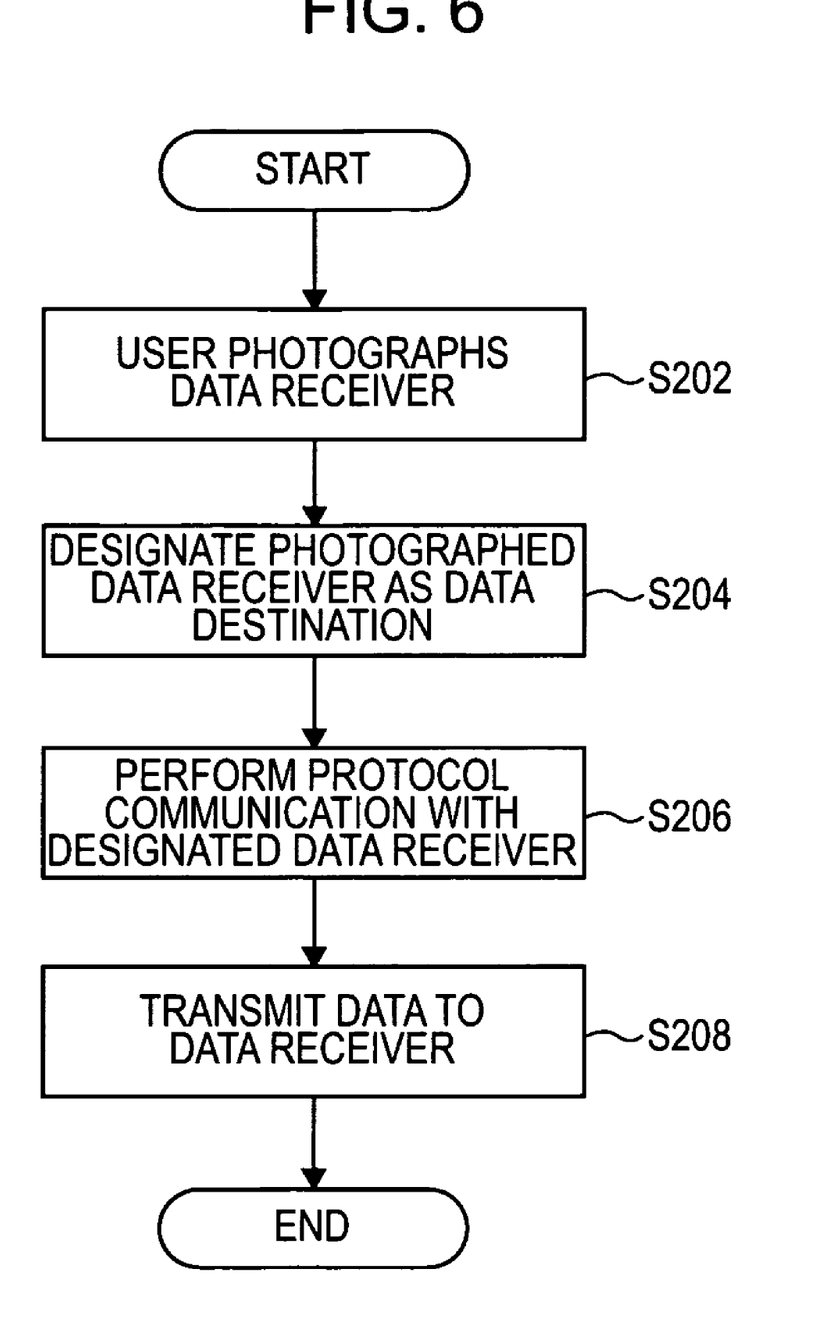
FIG. 6 is a flowchart illustrating a process flow of the data transmitter in accordance with one embodiment of the present invention.

The typical wireless connection protocol has been discussed. Referring to FIG. 6, the process flow of the data transmitter 100 is described below.

FIG. 6 is a flowchart of the process flow of the data transmitter 100. As shown in FIG. 5, the data transmitter 100 and the data receiver 200 are connected to each other in wireless communication with registration and authentication completed, and are ready to exchange data.

The user photographs the data receiver 200 using the image pickup device in the data transmitter 100 (step S202). The user having the data transmitter 100 photographs the data receiver 200 as the data transmission destination using the image pickup device in the data transmitter 100. The image of the data receiver 200 is then displayed on a display of the data transmitter 100.

After the data receiver 200 is photographed in step S202, the data receiver 200 is designated as the data transmission destination (step S204). In step S204, the user designates the data receiver 200 displayed on the display as the data transmission destination by selecting a button, for example.

The data transmitter 100 performs a protocol communication with the data receiver 200 designated in step S204 (step S206). In step S206, the data transmitter 100 transmits the communication designation command to the data receiver 200. Upon receiving an ACK packet from the data receiver 200, the data transmitter 100 can now transmit data to and receive data from the designated data receiver 200.

After the protocol communication is performed between the data transmitter 100 and the data receiver 200 in step S206, the data transmitter 100 transmits data to the data receiver 200 (step S208). The data transmitted is contained in the previously discussed communication packet. By transmitting the communication packet to the data receiver 200, the data transmitter 100 can transmit the data to the designated data receiver 200. The process flow of the data transmitter 100 has been discussed. The process flow of the data receiver 200 is described below with reference to FIG. 7.

Figure 7:
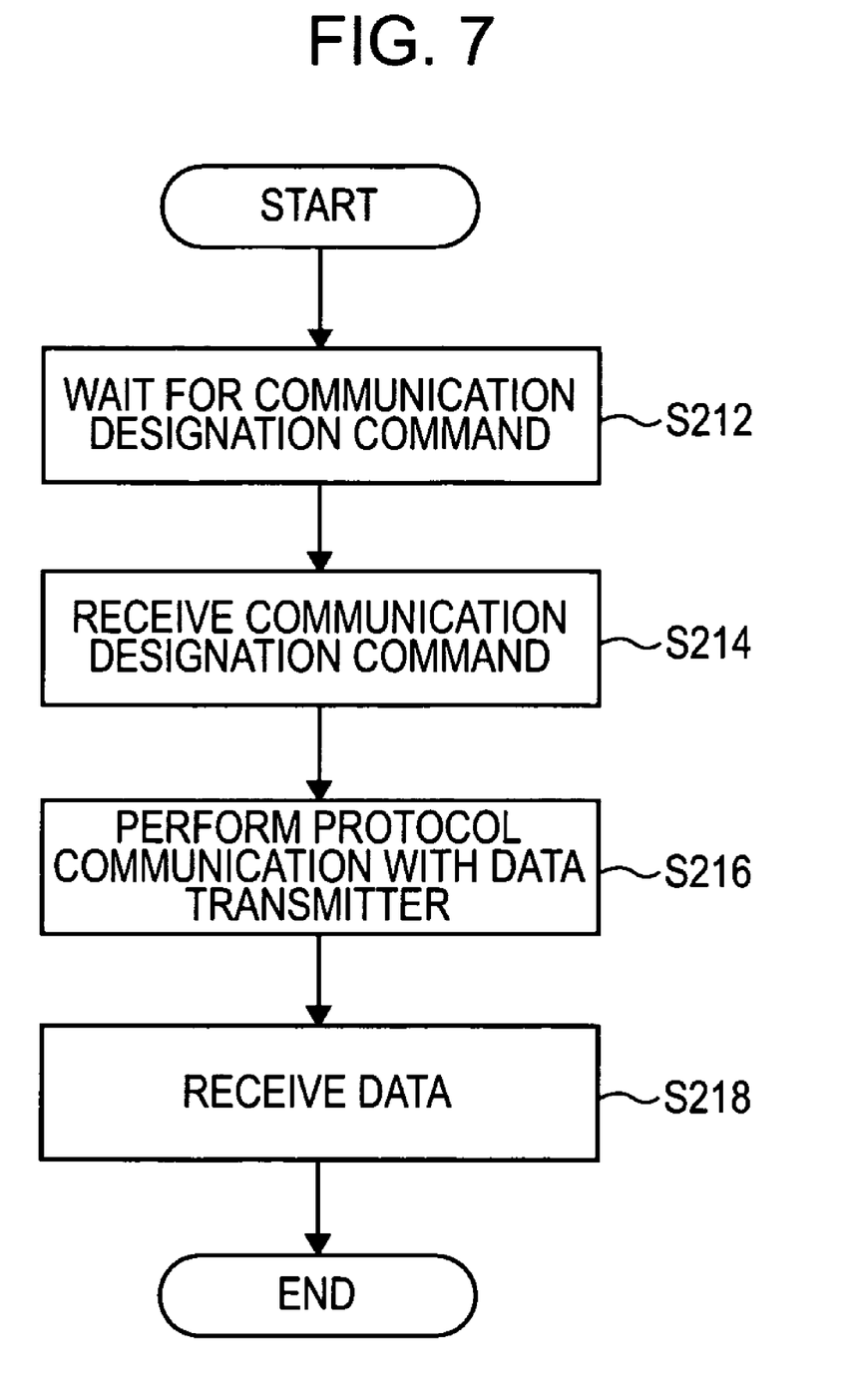
FIG. 7 is a flowchart illustrating a process flow of the data receiver in accordance with one embodiment of the present invention.

FIG. 7 is a flowchart of the process flow of the data receiver 200. As the data transmitter 100, the data receiver 200 is ready to exchange data with registration and authentication completed in wireless communication.

The data receiver 200 waits for the transmission of the communication designation command by the data transmitter 100 ready to transmit and receive data (step S212). The data receiver 200 receives the communication designation command from the data transmitter 100 (step S214).

As previously discussed, the communication designation command contains the preamble for establishing synchronization, the source address, the data length, and the data type. The data receiver 200 verifies each piece of data contained in the communication designation command. For example, the data receiver 200 determines whether the exchanging of data with the source is possible, and whether there is no particular problem with the data length and the data type. The data receiver 200 then performs a protocol communication with the data transmitter 100 (step S216). In step S216, the above-described ACK packet is transmitted from the data receiver 200 to the data transmitter 100, and then the data receiver 200 is enabled to receive data.

After performing the protocol communication with the data transmitter 100 in step S216, the data receiver 200 receives the data transmitted from the data transmitter 100 (step S218). The process flow of the data receiver 200 has been discussed. The process flow of the data transmitter 100 for designating the data receiver 200 is described below in detail.

Figure 8:
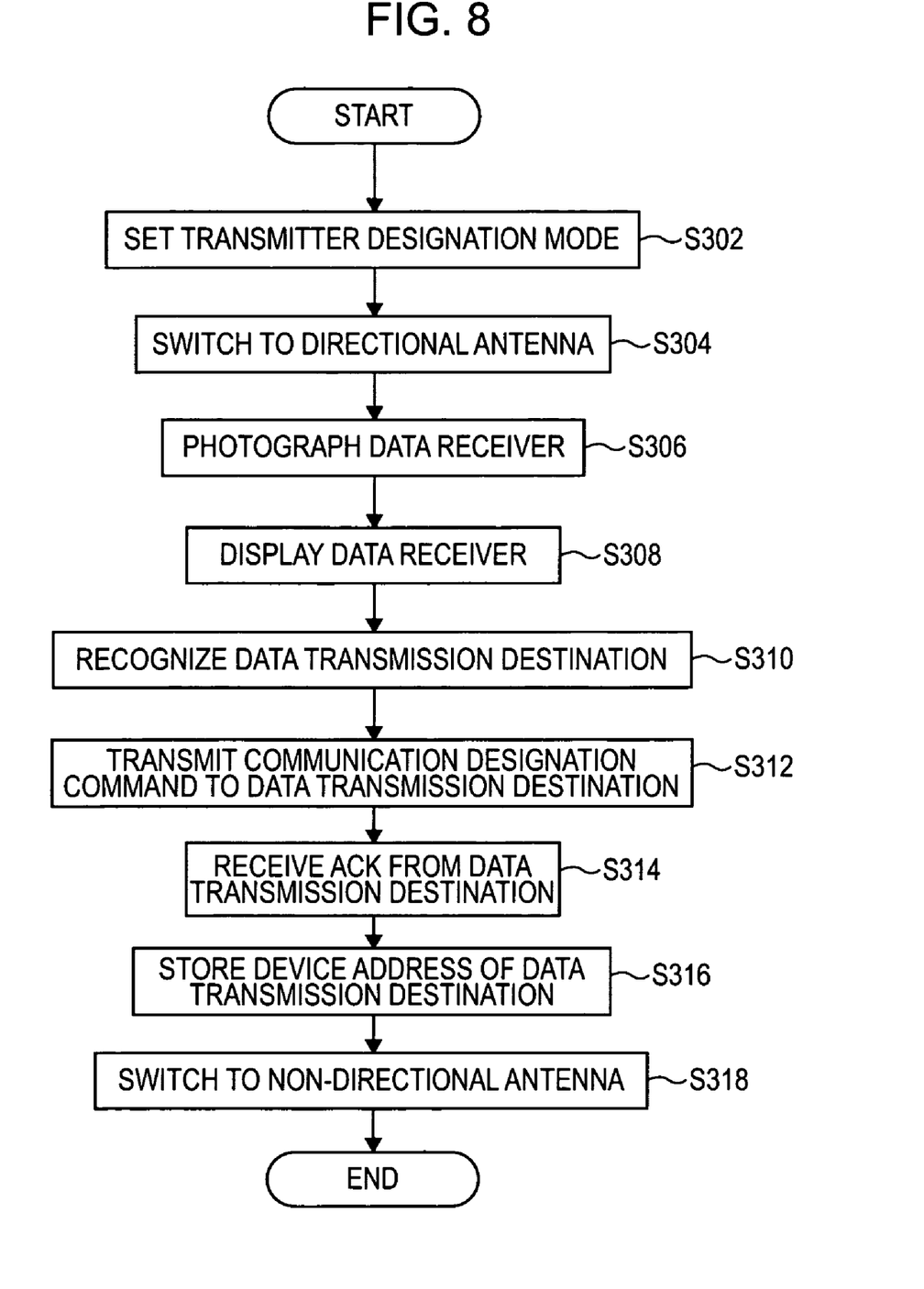
FIG. 8 is a flowchart illustrating a process flow of the data transmitter for designating a data receiver in accordance with one embodiment of the present invention.

FIG. 8 is a flowchart of the data transmitter 100 that designates the data receiver 200. The user having the data transmitter 100 now transmits data of the data transmitter 100 to the data receiver 200. A transmission destination designation mode is set in response to an input of the user of the data transmitter 100 (step S302). If the transmission destination designation mode is set in step S302, the data transmitter 100 is switched to the directional antenna (step S304). The directional antenna having a directivity to a particular direction is capable of transmitting radiowaves to the particular direction only.

The image pickup device in the data transmitter 100 photographs the data receiver 200 as the data transmission destination (step S306). The data receiver 200 photographed in step S306 is displayed on the display of the data transmitter 100 (step S308). In response to the user's selection of a button, the data receiver 200 displayed on the display is recognized as the data transmission destination (step S310).

Through steps S306 through S308, the direction in which the directional antenna transmits radiowaves is designated. In accordance with the present embodiment, the data receiver 200 is designated as the data transmission destination after setting the data transmission destination mode herein. The present invention is not limited to this sequence. Alternatively, switching to the directional antenna may be performed when the user selects the button to recognize the data receiver 200 displayed on the display of the data transmitter 100 as the data transmission destination in step S310.

After the data transmission destination is recognized and designated in step S310, the communication designation command is transmitted to the data transmission destination (step S312). Upon receiving the communication designation command, the data receiver 200 transmits the ACK packet to the data transmitter 100 to notify the data transmitter 100 that the communication designation command has been received. The data transmitter 100 receives the ACK packet from the data receiver 200 (step S314).

The data transmitter 100, which has received the ACK packet from the data receiver 200 as the data transmission destination, stores the device address of the data receiver 200 contained in the ACK packet (step S316). After storing the device address of the data receiver 200 as the data transmission destination in step S316, the data transmitter 100 switches the antenna 130 to the non-directional antenna (step S318).

If the device address of the data receiver 200 is stored in step S316, the address of the transmission destination can be attached to the data to be transmitted. By designating the device address of the data receiver 200 to the transmission destination address, data exchanging can be performed in ordinary wireless communication between the data transmitter 100 and the data receiver 200.

As discussed above, the antenna 130 of the data transmitter 100 can be switched between the directional antenna and the non-directional antenna as required. With wireless communication established among nearby apparatuses, a single data receiver 200 can easily and intuitively be identified from among the plurality of data receivers 200 by switching to the directional antenna. The process flow of the data receiver 200 has been discussed. In this embodiment, the data receiver 200 is designated by using the directional antenna. The present invention is not limited to this method.

Infrared light may be used to designate a data receiver 200. If infrared light is used, the data transmitter 100 includes an infrared light emitter for emitting a power control signal in infrared light. The infrared light emitter transmits the communication designation command. In the present embodiment, the command transmitter 124 may transmits the communication designation command in infrared light.

The communication designation command transmitted from the infrared light emitter in the data transmitter 100 is received by the data receiver 200. In this case, the data receiver 200 needs an infrared light receiver for receiving the infrared light signal. In the present embodiment, the command receiver 204 in the data receiver 200 may receive the communication designation command transmitted in infrared light.

To transmit and receive the communication designation command in infrared light, the infrared light emitter in the data transmitter 100 is aligned with the infrared light receiver in the data transmitter 100. Without the need for switching from the non-directional antenna to the directional antenna, the use of infrared light allows a single data receiver 200 to be designated from among the plurality of data receivers 200.

Whether to designate the data transmission destination using infrared light or the directional antenna may be determined depending on a distance or geometry between the data transmitter 100 and the data receiver 200. If infrared light is used to identify the data receiver 200 as the data transmission destination, the infrared light emitter in the data transmitter 100 and the infrared light receiver in the data receiver 200 need to be closely located to each other. If the infrared light receiver in the data receiver 200 is located close to the wall of a room even with the data transmitter 100 and the data receiver 200 in close range, the data receiver 200 needs to be moved in position. If the directional antenna is used in such a case, the data transmission destination is designated without the need for modifying the location of the data receiver 200.

Figure 9:
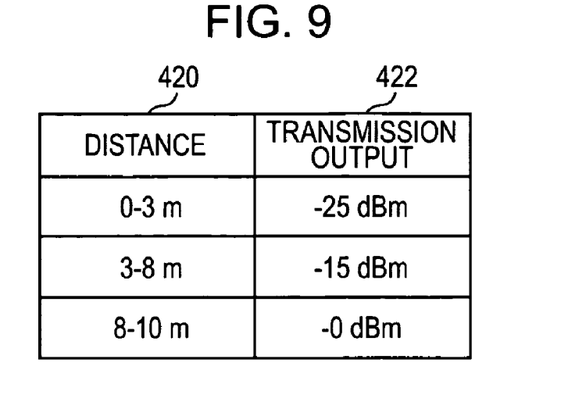
FIG. 9 illustrates the relationship of a distance between the data transmitter and the data receiver and transmission output power in accordance with one embodiment of the present invention.
Figure 10:
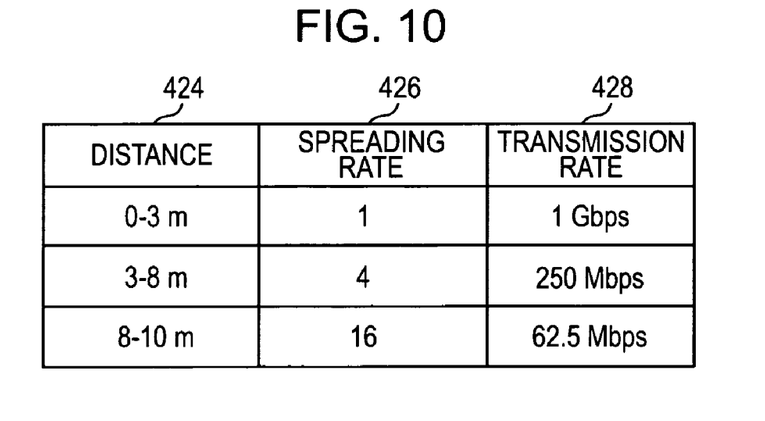
FIG. 10 illustrates the relationship of the distance, between the data transmitter and the data receiver, and each of a spreading rate and a transmission rate.
Figure 11:
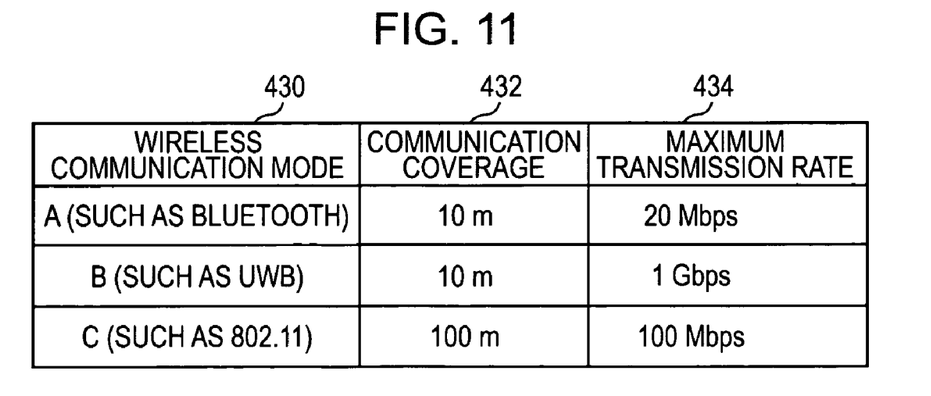
FIG. 11 illustrates the relationship between a wireless communication coverage area and a maximum transmission rate in accordance with one embodiment of the present invention.

If an infrared auto-focus mechanism is arranged together with the infrared light emitter in the data transmitter 100, a distance between the data transmitter 100 and the data receiver 200 can be measured. Referring to FIGS. 9 through 11, data transmission control using the auto-focus mechanism is discussed below.

With the auto-focus mechanism incorporated in the data transmitter 100, the distance between the data transmitter 100 and the data receiver 200 as the data transmission destination is measured. The data transmitter 100 emits an infrared light beam from the infrared light emitter, and measures the distance by an angle of incidence of infrared light reflected form a subject that is photographed by the image pickup device. For example, if the angle of incidence is small, the subject is far, and if the angle of incidence is large, the subject is near.

The distance may be measured using infrared light, and transmission output may be controlled in response to the measured distance. FIG. 9 shows a table listing the relationship of a distance 420 between the data transmitter 100 and the data receiver 200 and a transmission output 422. For example, the memory 132 of the data transmitter 100 stores beforehand data concerning the output power that is determined by the measured distance. The controller 114 in the data transmitter 100 compares a distance measured using infrared light with the data stored in the memory, and thus determines the transmission output responsive to the measured distance.

For example, if the distance between the data transmitter 100 and the data receiver 200 is 2 m, data can be transmitted at a level −25 dBm. By varying the transmission output in response to the distance, power consumption of the data transmitter 100 is controlled.

Spread spectrum technique may be used. In the spread spectrum technique, a digital signal is spread into a band wider than an original band using a signal called a spread code, and is then transmitted. On the receiver side, the same spread code is used to despread the spread signal into the original signal. Since the original signal cannot be restored without using the same spread code, confidentiality is assured in the spread spectrum technique. Furthermore, the spread spectrum technique is robust to noise, and free from sudden quality drop even if communication traffic becomes congested.

FIG. 10 illustrates the relationship of a distance 424 between the data transmitter 100 and the data receiver 200, spreading rate 426, and transmission rate 428. For example, the memory 132 of the data transmitter 100 stores beforehand data concerning the spreading rate 426 and the transmission rate 428, determined in response to the distance. The controller 114 in the data transmitter 100 compares the distance measured by infrared light with the data stored in the memory 132. The spreading rate and the transmission rate are thus determined based on the measured distance.

If the distance is as short as 2 m, communication quality is lowered with the spreading rate 426 lowered, and the transmission rate 428 is heightened. If the distance is as long as 9 m, communication quality is raised with the spreading rate 426 raised, and the transmission rate 428 is lowered. By changing the spreading rate 426 in response to the distance, data communication traffic is properly controlled with the transmission output maintained at constant.

The wireless communication mode is determined based on the measured distance as discussed below. FIG. 11 illustrates the relationship of wireless communication mode 430, communication coverage 432, and the maximum transmission rate 434. For example, the memory 132 of the data transmitter 100 stores beforehand data concerning a wireless communication mode that is determined based on the distance and the amount of data. The controller 114 in the data transmitter 100 compares the distance measured by infrared light and the amount of transmission data with the data stored in the memory 132 to select an optimum wireless communication mode.

For example, if the transmission data is 500 Mbits with the communication distance being 4 m, the controller 114 in the data transmitter 100 selects wireless communication mode B (such as UWB). If the transmission data is 500 Mbits with the communication distance being 20 m, the controller 114 in the data transmitter 100 selects wireless communication mode C (such as IEEE802.11).

Efficient wireless communications are thus performed by selecting optimum transmission output power, spreading rate, and wireless communication mode in response to the measured distance.

In accordance with the above-described embodiments of the present invention, the communication designation command is transmitted to the data transmission destination using one of the directional antenna and infrared light, and the data transmission destination returns the ACK packet containing the device address. The data transmission destination is thus identified. The present invention is not limited to the above-described embodiments. For example, a bar code containing device information may be attached to a data receiver as a data transmission destination, and the device information may be acquired by photographing the bar code.

If the above-mentioned bar code is a quick response (QR) bar code, the data transmitter may be provided with a QR bar code reader. The data transmitter thus reads and decodes the QR bar code attached on the data receiver. The QR bar code attached to the data receiver may contain information relating to the name of a manufacturer, the name of the product, control information, product identification number, etc. An image pickup device mounted on the data transmitter photographs the QR code, thereby acquiring the product information. The user can thus designate the data transmission destination by simply photographing the QR bar code attached on the data receiver.

In the above-described embodiments, the data transmitter including the image pickup device identifies the data transmitter. The present invention is not limited to this arrangement. Alternatively, an apparatus separate from the data transmitter may identify the data receiver. For example, the separate apparatus may be a remote controller composed of an image pickup device, a transceiver, a memory, etc. The user then photographs the QR code attached on the data receiver using the image pickup device in the remote controller, thereby acquiring device information of the data receiver. The acquired device information is transmitted to the data transmitter. Upon receiving the device information, the data transmitter identifies the data receiver, and becomes ready to transmit transmission data to the data receiver.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system comprising a data transmitter having an image pickup device and a plurality of data receivers, for performing interactive wireless data communications between the data transmitter and each of the data receivers, wherein the data transmitter comprises:
 a display for displaying an image of a data receiver photographed by the image pickup device, from among the plurality of data receivers;
 a data transmission destination recognizer for recognizing, as a transmission destination of transmission data, the data receiver with the image thereof displayed on the display;
 a directional antenna controller for directing a directional antenna to the data receiver recognized as the transmission destination of the transmission data by the data transmission destination recognizer;
 a command transmitter for transmitting a communication designation command to the data receiver to which the directional antenna is directed by the directional antenna controller;
 a device address storage for storing a device address of the data receiver;
 a non-directional antenna;
 a transmission destination designation mode setter for setting a transmission destination designation mode in response to an input by a user; and
 an antenna switch for switching from the non-directional antenna to the directional antenna when the transmission destination designation mode is set by the transmission destination designation mode setter, wherein the antenna switch switches from the directional antenna to the non-directional antenna after the device address storage stores the device address of the data receiver; and
the data receiver comprises:
 a command receiver for receiving the communication designation command transmitted by the data transmitter; and
 an ACK transmitter for transmitting, to the data transmitter, an ACK packet containing the device address of the data receiver, subsequent to a reception of the communication designation command.

2. A data transmitter, having an image pickup device, for performing interactive wireless data communications with each of a plurality of data receivers, the data transmitter comprising:
 a display for displaying an image of a data receiver photographed by the image pickup device, from among the plurality of data receivers;
 a data transmission destination recognizer for recognizing, as a transmission destination of transmission data, the data receiver with the image thereof displayed on the display;
 a directional antenna controller for directing a directional antenna to the data receiver recognized as the transmission destination of the transmission data by the data transmission destination recognizer;
 a command transmitter for transmitting a communication designation command to the data receiver to which the directional antenna is directed by the directional antenna controller;
 an ACK receiver receiving an ACK packet, containing a device address of the data receiver, from the data receiver to which the communication designation command has been transmitted by the command transmitter;
 a device address storage for storing the device address of the data receiver received by the ACK receiver;
 a non-directional antenna;
 a transmission destination designation mode setter for setting a transmission destination designation mode in response to an input by a user; and
 an antenna switch for switching from the non-directional antenna to the directional antenna when the transmission destination designation mode is set by the transmission destination designation mode setter, wherein the antenna switch switches from the directional antenna to the non-directional antenna after the device address storage stores the device address of the data receiver.

3. The data transmitter according to claim 2, wherein the communication designation command to be transmitted to the data receiver by the command transmitter comprises information identifying the data transmitter, a length of transmission data, and a type of the transmission data.

4. The data transmitter according to claim 2, wherein at least the device address of the data receiver stored in the device address storage is transmitted together with the data to be transmitted to the data receiver.

5. The data transmitter according to claim 2, wherein the command transmitter transmits the communication designation command using infrared light to the data receiver with the image thereof displayed on the display.

6. The data transmitter according to claim 2, wherein the image pickup device in the data transmitter measures a distance to the data receiver using an infrared auto-focus mechanism, and determines transmission power of the transmission data in response to the measured distance.

7. The data transmitter according to claim 2, wherein the image pickup device in the data transmitter measures a distance to the data receiver using an infrared auto-focus mechanism, and determines a transmission rate of the transmission data in response to the measured distance.

8. The data transmitter according to claim 2, wherein the image pickup device in the data transmitter measures a distance to the data receiver using an infrared auto-focus mechanism, and determines a wireless communication mode of the transmission data in response to the measured distance.

9. A method of performing interactive wireless data communications between a data transmitter, having an image pickup device, and a plurality of data receivers, the method comprising steps of:

displaying an image of a data receiver photographed by the image pickup device, from among the plurality of data receivers;

recognizing, as a transmission destination of transmission data, the data receiver based on the displayed;

directing a directional antenna to the data receiver recognized as the transmission destination of the transmission data;

transmitting a communication designation command to the data receiver to which the directional antenna is directed;

receiving an ACK packet, containing a device address of the data receiver, from the data receiver to which the communication designation command has been transmitted;

storing the received device address;

setting a transmission destination designation mode in response to an input by a user: and switching from a non-directional antenna to the directional antenna when the transmission destination designation mode is set, wherein the switch from the non-directional antenna to the direction antenna occurs after the received device address is stored.

* * * * *